S. G. GERLACH.
COMBINATION LOCK.
APPLICATION FILED OCT. 8, 1918.
1,322,427.
Patented Nov. 18, 1919.
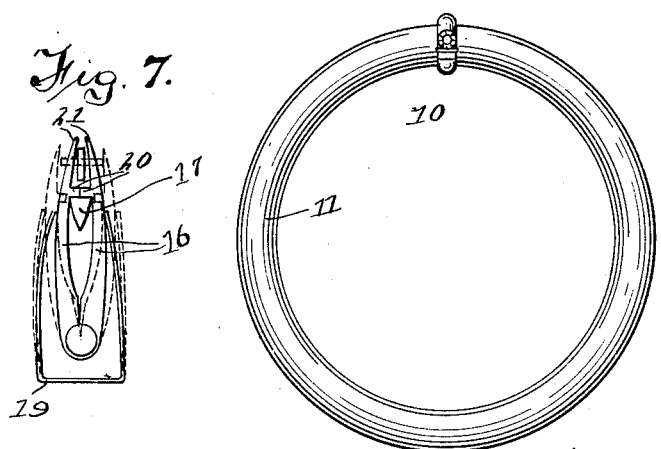
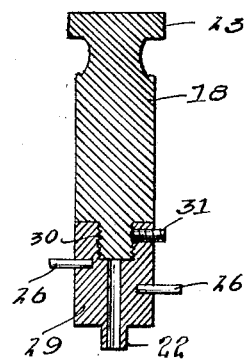
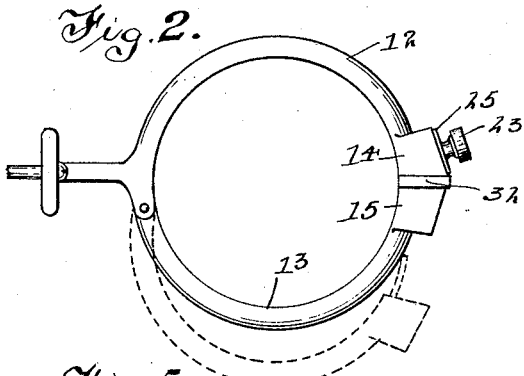
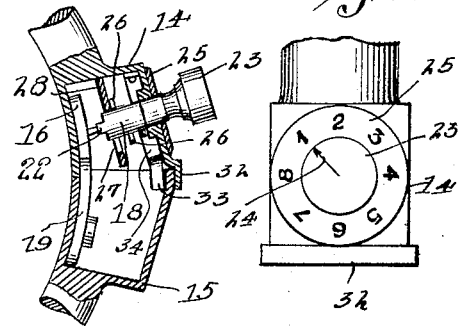
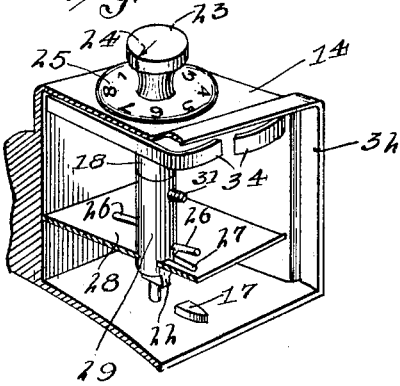
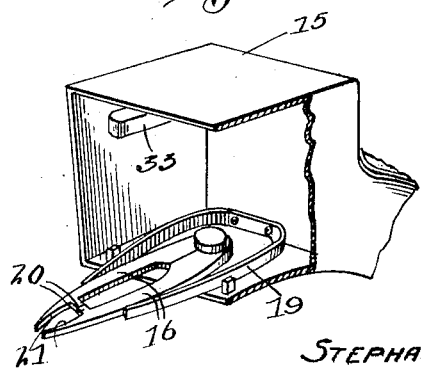
Inventor
STEPHAN G. GERLACH
By Victor J. Evans
Attorney

UNITED STATES PATENT OFFICE.

STEPHAN G. GERLACH, OF STRATFORD, CONNECTICUT.

COMBINATION-LOCK.

1,322,427.　　　Specification of Letters Patent.　　Patented Nov. 18, 1919.

Application filed October 8, 1918. Serial No. 257,420.

*To all whom it may concern:*

Be it known that I, STEPHAN G. GERLACH, a citizen of the United States, residing at Stratford, in the county of Fairfield and State of Connecticut, have invented new and useful Improvements in Combination-Locks, of which the following is a specification.

The object of the invention is to provide a simple, relatively inexpensive and efficient combination or permutation lock adaptable for example for use in connection with automobile tire holders and designed as an efficient means for preventing accidental or surreptitious displacement of a tire without requiring that the owner or driver of the vehicle carry a key as a means of manipulating the lock, and to this end the invention consists in a construction, combination and relation of parts hereinafter set forth, it being understood that changes in form proportion and details may be resorted to, within the scope of the appended claims, without departing from the principles involved.

In the drawing:—

Figure 1 is a general view of the lock applied to an automobile tire holder.

Fig. 2 is a detail side view of the holder and lock, the former being shown in dotted lines in open position.

Fig. 3 is a detail sectional view of the lock of which the members are carried respectively by those of the holder.

Fig. 4 is a face view of the lock showing one member only thereof.

Fig. 5 is a detail view in perspective of the member of the lock shown in Fig. 4.

Fig. 6 is a similar view of the other member of the lock.

Fig. 7 is a detail view of the clamping or locking jaw and the actuating spring for the same as shown in engagement with the stud carried by the other member of the lock.

Fig. 8 is a detail view of the lock spindle or arbor.

In Fig. 1 the lock is shown applied to a holder 10 in engagement with a tire 11, and in Fig. 2 said lock which consists of the jaws 12 and 13 is shown in full lines in its closed or tire engaging position and in dotted lines in its open or tire releasing position, the lock members 14 and 15 being carried respectively by said holder jaws.
The lock members are hollow as illustrated more particularly in Figs. 3, 5 and 6 so that when combined or arranged in their normal or locking position to constitute a casing for the reception of the movable elements of the lock consisting essentially of the locking jaws 16 for engagement with a stud 17, and a spindle or arbor 18 which is constructed and adapted to spread or open the jaws against the tension of the jaw closing spring 19 when it is desired to disengage the lock members so as to open the jaws of the holder and release the tire. The said locking jaws 16 are provided with ears or shoulders 20 for engagement with the stud 17 carried by the other member of the lock and the extremities of said jaws beyond the ears are provided with transversely registering seats 21 which combine to form a cavity for the reception of a cross head 22 on the inner end of the spindle or arbor 18 so that when an engagement of the cross head with the said recess has been effected the turning of the arbor or spindle will serve to separate the jaws and thus release the lug or stud 17 to permit of the separation of the lock members.

At its outer end the spindle or arbor is provided with a thumb hold or knob 23 with which is associated a pointer 24 and a dial 25 carrying suitable combination or permutation characters while within the lock casing the said arbor or spindle is provided with ward pins 26 for registration with a ward slot 27 formed in a ward plate 28, it being necessary that said ward pins or equivalent elements be registered successively with the coöperative ward element such as the slot in the plate in order to permit of a sufficient axial movement of the spindle or arbor to secure engagement of the cross head 22 with the teeth of the locking jaws so that the latter may be separated to disengage the stud 17. Consequently, to successfully manipulate the lock, one must know the combination in order to bring the pins 26 into registration with the slot 27, so as to move the spindle axially.

Preferably these pins 26 are carried by a section 29 of the spindle or arbor which is secured to the body portion of the said spindle or arbor by means of a swivel or threaded joint 30, so that the relation between the pins and the pointer or indicator 24 may be varied to change the combination of the lock, and a set screw 31 may be employed to secure the adjustable section 29 in a set position with reference to the body portion of the spindle. Obviously the combination may be altered in this way as may be found necessary and a knowledge of the combination to which the lock is set may remain the exclusive property of the owner or driver of the vehicle in connection with which the device is employed.

As an auxiliary means of securing and maintaining the proper alinement of the parts the member 15 thereof may be fitted within a flange 32 of the member 14 and a centering lug 33 on the former may be engaged by centering springs 34 on the latter as shown in detail in Figs. 5 and 6.

While the lock has been described as especially adapted for use in connection with tire holders it will be understood obviously that it may efficiently be employed in other relations where similar conditions of use obtain, and where manipulation either in locking or unlocking is at times required under adverse or unfavorable weather conditions and where the use of a key would be a disadvantage.

Having thus described the invention I claim:—

1. A combination lock having separable casing members provided respectively with spring actuated jaws, and a stud for engagement thereby, a revoluble and axially movable spindle provided with a cross head for disengaging relation with said jaws, pins projecting from said spindle, and means arranged within one of said members for providing a passage for said pins upon axial movement of said spindle.

2. A combination lock having separable casing members provided respectively with spring actuated jaws, and a stud for engagement thereby, a revoluble and axial movable spindle provided with a cross head for disengaging relation with said jaws, a partition arranged in one of said members, and provided with a slot, and pins projecting from said spindle, in a staggered relation with regard to said slot for the purpose specified.

3. A combination lock having separable casing members provided especially with spring actuated jaws and adapted for engagement thereby, a jaw operating spindle mounted in one of said members for rotary and axial movement, coöperating means carried by the spindle and said member for controlling the axial movement of the spindle, and centering means carried especially by said casing members, and consisting of a stud on one of them and a coöperating spring element on the other member.

4. A combination lock having casing members provided respectively with spring actuated jaws and a stud for engagement thereby, an axially and revoluble movable arbor or spindle provided with a cross head for operating engagement with said jaws, pins projecting from said spindle, means within one of said casing members for providing a passage for said pins upon axial movement of said spindle, and exposed means associated with said spindle for manipulating the latter to move the cross head thereof into engagement with said jaws.

5. A combination lock having separable casing members, provided respectively with spring actuated jaws and a stud for engagement thereby, a jaw operating spindle mounted for rotary and axial movement, a partition arranged in the member in which the spindle is mounted, said partition having a slot, pins projecting from the spindle and arranged in staggered relation with regard to said slot, and exposed means associated with the body portion of the spindle for manipulating the same to secure registration of said pins successively with said slot for the purpose specified.

6. A combination lock having separable casing members provided respectively with spring actuated jaws and a stud for engagement thereby, a jaw operating spindle for rotary and axial movement, a slotted partition in one of said members, pins projecting from said spindle in staggered relation with regard to said slot, said spindle including relatively adjustable sections, whereby the relation of said pins with regard to the slot may be varied, means for holding the sections of the spindle fixed relatively in a given position, and exposed means associated with the spindle for manipulating the same to secure registration of said pins with said slot.

7. A combination lock having separable casing members, provided respectively with spring actuated jaws and a stud for engagement thereby, the ends of said jaws projecting an appreciable distance beyond their point of engagement with said stud, a revoluble and axially movable spindle provided with a cross head for disengaging relation with the projecting terminals of said jaw, a slotted partition in one of the casing members, pins projecting from the spindle in staggered relation with regard to said slot, and an exposed pointer-carrying knob attached to the spindle and having associated therewith a dial bearing permutation characters.

In testimony whereof I affix my signature.

STEPHAN G. GERLACH.